(12) United States Patent
Coots

(10) Patent No.: US 10,745,208 B1
(45) Date of Patent: Aug. 18, 2020

(54) TIE PLATE STRAIGHTENER AND METHOD

(71) Applicant: B & B Metals, Inc., Shepherdsville, KY (US)

(72) Inventor: William R. Coots, Lebanon Junction, KY (US)

(73) Assignee: B & B METALS, INC., Shepherdsville, KY (US)

( * ) Notice: Subject to any disclaimer, the term of this patent is extended or adjusted under 35 U.S.C. 154(b) by 0 days.

(21) Appl. No.: 16/418,155

(22) Filed: May 21, 2019

Related U.S. Application Data

(62) Division of application No. 15/474,618, filed on Mar. 30, 2017, now Pat. No. 10,329,100.

(60) Provisional application No. 62/318,263, filed on Apr. 5, 2016.

(51) Int. Cl.
| | |
|---|---|
| *B65G 47/24* | (2006.01) |
| *B65G 47/00* | (2006.01) |
| *B65G 39/02* | (2006.01) |
| *B65G 47/244* | (2006.01) |
| *B65G 13/02* | (2006.01) |
| *E01B 29/24* | (2006.01) |

(52) U.S. Cl.
CPC ........... *B65G 47/244* (2013.01); *B65G 13/02* (2013.01); *B65G 39/02* (2013.01); *E01B 29/24* (2013.01)

(58) Field of Classification Search
None
See application file for complete search history.

(56) References Cited

U.S. PATENT DOCUMENTS

| | | | |
|---|---|---|---|
| 1,114,621 A | 10/1914 | Lewis | |
| 1,342,220 A | 6/1920 | Lewis et al. | |
| 2,637,433 A | 5/1953 | Shuttleworth | |
| 2,767,666 A | 10/1956 | Rhodes | |
| 3,068,989 A | 12/1962 | Packman et al. | |
| 3,758,104 A | 9/1973 | Daily | |
| 3,782,521 A | 1/1974 | Hengelhaupt | |
| 3,782,527 A | 1/1974 | Petershack | |
| 4,280,613 A | 7/1981 | Stewart | |
| 4,978,272 A | 12/1990 | Leon | |
| 5,145,049 A * | 9/1992 | McClurkin | B65G 47/086 198/374 |
| 5,191,962 A | 3/1993 | Wegscheider et al. | |
| 5,343,606 A * | 9/1994 | Girouard, Sr. | B23B 39/167 104/16 |
| 5,664,661 A | 9/1997 | Maier | |
| 5,836,439 A | 11/1998 | Coyette | |
| 6,505,733 B2 | 1/2003 | Troupos et al. | |
| 6,681,917 B2 | 1/2004 | Van Den Goor | |

(Continued)

FOREIGN PATENT DOCUMENTS

| | | |
|---|---|---|
| DE | 3330108 C1 | 1/1985 |
| JP | 56052315 A1 | 5/1981 |
| JP | 2008168956 A | 7/2008 |

*Primary Examiner* — Kavel Singh
(74) *Attorney, Agent, or Firm* — Middleton Reutlinger

(57) ABSTRACT

A tie plate straightener includes a plurality of rollers having varying cross-section and differing elevations. The tie plate straightener includes directional wheels between the rollers and disposed in alignment with the lower elevations of the rollers. The straightener receives tie plates at an input and rotates the tie plates when the tie plate engages the directional wheels. The tie plate is thereby oriented and/or positioned so that the tie plate is supported above the directional wheels.

6 Claims, 11 Drawing Sheets

(56) References Cited

U.S. PATENT DOCUMENTS

| | | |
|---|---|---|
| 6,938,751 B1 | 9/2005 | Eubanks et al. |
| 8,205,738 B1 | 6/2012 | Fourney |
| 9,676,563 B2 | 6/2017 | Itoh et al. |

\* cited by examiner

TIE PLATE STRAIGHTENER AND METHOD

CLAIM TO PRIORITY

This divisional patent application claims priority to and benefit of, under 35 U.S.C. § 121, U.S. patent application Ser. No. 15/474,618, filed Mar. 30, 2017, titled "Tie Plate Straightener", and claims priority to and benefit of, under 35 U.S.C. § 119(e), U.S. Provisional Patent Application Ser. No. 62/318,263, filed Apr. 5, 2016 titled "Tie Plate Straightener", all of which is incorporated by reference herein.

BACKGROUND

1. Field of the Invention

An apparatus and method is provided for rotating tie plates from a misaligned orientation to an aligned orientation in a tie plate distribution system. More specifically, an apparatus and method are provided which may receive tie plates in a misoriented condition and which aligns the tie plates for discharge in a correctly oriented manner, improving the efficiency of a tie plate distribution process.

2. Description of the Related Art

In railroad maintenance, tie plates are periodically replaced along with the rails of the railroad track. When the spent materials are removed from the railroad ties, a tie plate distribution system may be utilized to dispense tie plates on or near the railroad ties so that the tie plates may be subsequently installed. Various systems are utilized to dispense or distribute these tie plates and some systems have been created in which tie plates may be separated by a tie plate separator and then positioned on a conveyor belt for subsequent distribution along the path of the railroad track.

In current tie plate distribution systems, sorting and/or separating of tie plates, including orientation of the plates, is a highly manual endeavor. Workers stand along conveyors to lift, rotate and/or orient tie plates for proper feeding location. This typically requires two men on lower output machines and as many as six men on high output or high production machines. When dispensing these tie plates, it is desirable to reduce the number of laborers required to conduct this process. Manual lifting or handling of tie plates may injure laborers and further, automated processes may improve the speed with which the tie plate dispensing may occur. Due to labor costs and a desire to eliminate job functions where lifting or other injuries might occur, it would be desirable to automate as many of these labor positions as possible. Improved speed of tie plate distribution and general railroad maintenance is always desirable since shut-down of the railroad is necessary to conduct these maintenance procedures and results in down time of the railroad, costing time and money to the railroad companies.

Further, when distributing tie plates along the path of the track, on or near the railroad ties, it is desirable to dispense the tie plates in an organized fashion. This means that the tie plates should desirably be configured or oriented in a suitable manner for repeated distribution throughout the process and best installation practice. It would be desirable to provide an apparatus and method for organizing tie plates on a tie plate distribution system which straightens or aligns the tie plates, so that edges are at least parallel, if not aligned, in organized and consistent fashion before subsequent distribution along a railroad track path and for use during railroad maintenance procedure.

Additionally, it would be desirable to increase the throughput of tie plates to increase efficiencies associated with distribution and therefore decrease the downtime of railroad tracks during maintenance periods when tie plate replacement is necessary.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

According to at least one embodiment, a tie plate straightener is provided which receives a plurality of tie plates at an input wherein at least some of the tie plates may be misoriented and wherein the tie plate straightener engages the misoriented tie plates to straighten and/or position such tie plates to a desired orientation and subsequently discharges the tie plates at the output end of the tie plate straightener.

According to some embodiments, a tie plate straightener comprises a roller conveyor having an input and an output, a plurality of rollers at least some of which have a varying cross-section, at least one first directional wheel having an axis which is transverse to the plurality of rollers, at least one second directional wheel having an axis which is transverse to the plurality of rollers. The at least one first directional wheel may turn in a first direction and the at least one second directional wheel turning in a second direction. The first directional wheels may be aligned with a lower elevation of the varying cross-section of the plurality of rollers and the first and second directional wheels may have an upper elevation which is greater than a portion of the plurality of rollers.

Optionally, the first directional wheel may have an axis substantially perpendicular to axes of the plurality of rollers. The second directional wheel has an axis which is non-perpendicular to axis of the plurality of rollers. The plurality of rollers may have a larger diameter at ends and may have a smaller diameter between ends. The first and second directional wheels may be aligned with the smaller diameters. When tie plates are disposed in a smaller cross-section of the plurality of rollers, the tie plates engage the at least one first directional wheel and the at least one second directional wheel. The tie plate straightener wherein the upper elevation of the at least one first and second directional wheels is greater than the lower elevation of the varying cross-section of the plurality of rollers. The varying cross-section may be a linear taper or may be one of convex or concave a curvature. The lower elevation may be disposed near an end of the plurality of rollers or may be centrally disposed. The tie plate straightener further comprising a first directional belt disposed about the at least one first directional wheel and a second directional belt disposed about the second directional belt.

According to other embodiments, a tie plate straightener comprises a roller conveyor having an input and an output, a plurality of rollers disposed between the input and the output, the plurality of rollers having a varying cross-sectional shape, a first directional wheel disposed between at least one pair of the plurality of rollers, the first directional wheel having an axis which is non-parallel with axes of the plurality of rollers, the first directional wheel and the second directional wheel aligned in a longitudinal direction with a smaller cross-section of the plurality of rollers.

Optionally, each of the plurality of rollers may have centrally disposed smaller cross-sections or each of the plurality of rollers may have non-centrally disposed smaller cross-sections. The first and second directional wheels have an upper elevation which is greater than an upper elevation of the smaller cross-section of the plurality of rollers. The tie plate straightener may have the first directional wheel turning in a first direction and the second directional wheel turning in a second direction. The tie plate straightener wherein the plurality of rollers at a larger cross-section have an elevation which is higher than an elevation of the first directional wheel and the second directional wheel. The tie plate straightener wherein the directional wheels are pulleys and further comprising directional belts disposed about said pulleys.

According to other embodiments, the tie plate straightener comprises a conveyor having an input and an output which define a longitudinal direction, a plurality of rollers on the conveyor which have a varying cross-section defining at least a larger cross-sectional dimension and a smaller cross-sectional dimension, a first directional wheel disposed between a first pair of the plurality of rollers, the first directional wheel turning in a first direction, a second directional wheel disposed between a second pair of the plurality of rollers, the second directional wheel turning in a second direction, the first and second directional wheels being disposed in alignment with the smaller cross-sectional dimensions of the plurality of rollers, wherein a tie plate moves across the plurality of rollers and when positioned in the smaller cross-section dimension, the tie plates engage at least one of the first and second directional wheels.

According to further embodiments, a method of straightening tie plates comprises positioning one of the tie plates at an input of a roller conveyor, engaging the tie plate with one of a plurality of rollers of the roller conveyor, the tie plates having a varying cross-section with a high elevation and a low elevation, engaging the tie plates with directional wheels when the tie plates are aligned with the low elevation of the rollers, rotating the tie plate with the directional wheel adjacent to the plurality of rollers, and, limiting engagement of the directional wheels by the tie plates with the rotating.

According to still further embodiments, a tie plate straightener comprises one of: a plurality of rollers to move tie plates in a longitudinal direction between an input and an output of the straightener, at least one directional belt disposed between the plurality of rollers, the at least one directional belt directing tie plates into an adjacent guide wall and pivoting the tie plates into a desired orientation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of the tie plate straightener in accordance with the present invention will now be described by way of examples. These embodiments are not to limit the scope of the present embodiments as other embodiments of the tie plate straightener will become apparent to one having ordinary skill in the art upon reading the instant description. Examples of the present embodiments are shown in figures wherein.

DETAILED DESCRIPTION

Figure 1:
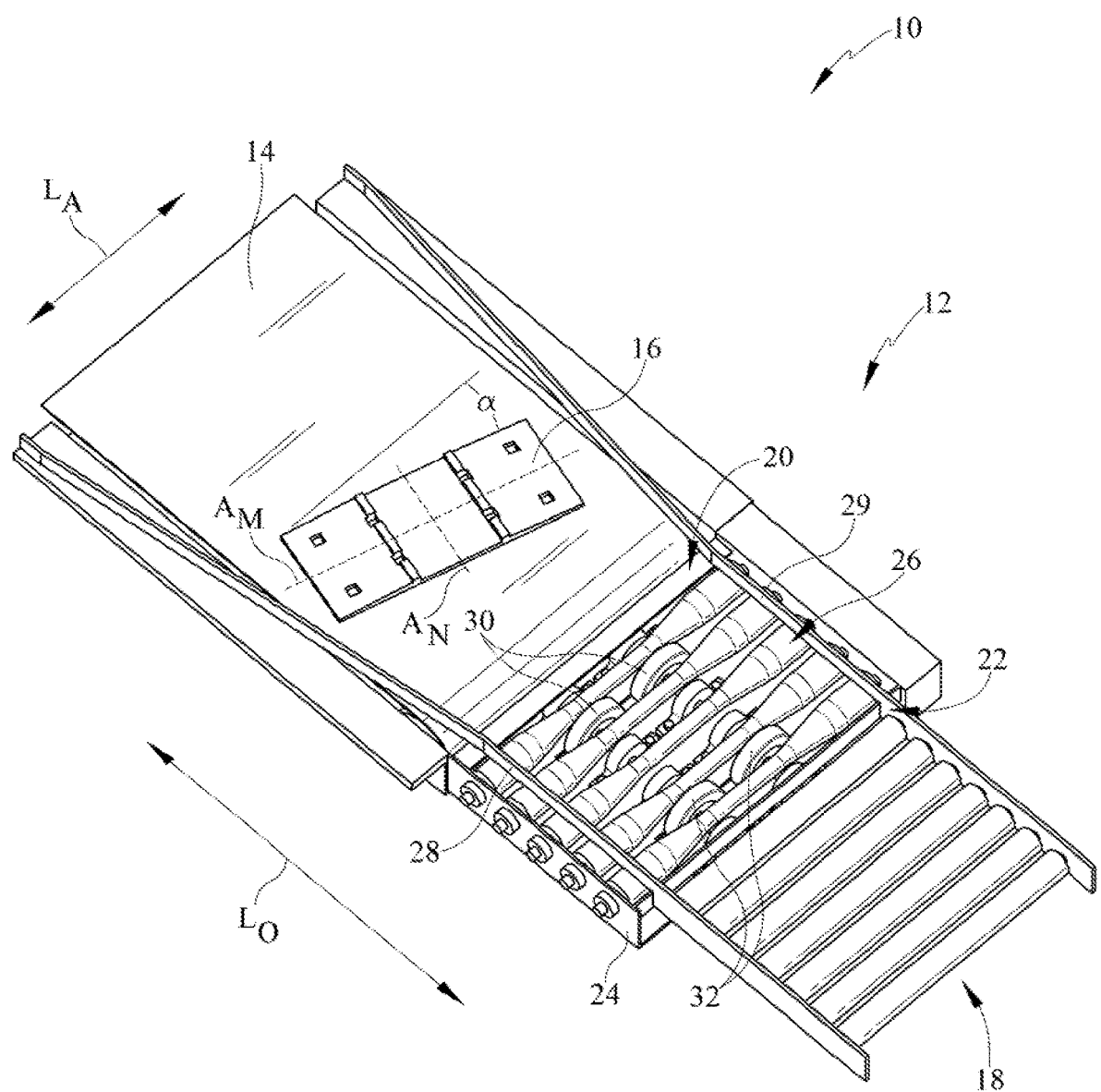
FIG. 1 depicts a perspective view a tie plate straightener comprising a roller conveyor.

It is to be understood that the tie plate straightener is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-11 various aspects of a tie plate straightener. Present embodiments relate to a tie plate straightener which receives a plurality of tie plates from a conveyor of some form and wherein some of the tie plates are misaligned relative to a desired orientation for exiting a tie plate distribution system. The tie plate straightener receives the tie plates and allows the properly aligned tie plates to pass without adjustment but rotates misaligned or misoriented tie plates in a manner so that the misaligned plates become properly aligned, oriented or straightened to the desired configuration for exiting the tie plate straightener and moving through the tie plate distribution system. A method is further shown herein for performing the function described with the various structures disclosed. As used however, the term "misaligned" means that the tie plates are oriented at differing directions.

Referring now to FIG. 1, a perspective view of a tie plate straightener 12 is depicted as part of a tie plate distribution system 10. The tie plate distribution system 10 includes a first conveyor 14 which inputs tie plates 16 to the tie plate straightener 12. The first conveyor 14 may take various forms including the belt conveyor depicted, a roller conveyor, a chute, a vibratory material conveyor or any other mechanism which has a conveying functionality and may be utilized for moving tie plates 16 to an input 20 of the tie plate straightener 12. The first conveyor may be dynamic or static, for example gravity feed, to allow movement of tie plates. Similarly, a conveyor 18 is shown downstream of the tie plate straightener 12 and is utilized to continue moving the aligned tie plates 16 through the tie plate distribution system 10.

The tie plate straightener 12 and the tie plate distribution system 10 define a longitudinal direction $L_O$ in which the tie plates 16 move. Alternatively, a lateral direction $L_A$ is also defined in the substantially perpendicular direction and parallel to the plane along which the tie plates 16 move. The plane of the lateral direction $L_A$ may be in the same plane and/or parallel to the longitudinal direction $L_O$. The tie plates 16 are moved by the conveyors 14 and as shown, may have a major axis $A_m$, which is longer and a shorter axis $A_n$ defining the rectangular shape, wherein longer edges or ends correspond to and extend in the major axis $A_m$ direction and the shorter edges or ends correspond to and extend in the minor axis $A_n$. According to some embodiments, it is desirable that the tie plates 16 be oriented so that the long axis of the tie plate 16 is directed in the lateral direction $L_A$ and the short axis of the tie plate 16 is directed in the longitudinal direction $L_O$. As depicted in the instant embodiment, the tie plate 16 is misaligned such that the tie plate 16 is not aligned with either of the longitudinal $L_O$ or the lateral $L_A$ directions. For example, in the instant embodiment, the tie plate 16 is shown rotated by an angle α so that the long axis of the tie plate 16 is out of alignment relative to the lateral $L_A$ direction by the depicted angle. This angle may vary but in general, according to some non-limiting embodiments, the long axis of the tie plate 16, or the long edges, should be directed in the lateral $L_A$ direction. Thus, the function of the tie plate straightener 12 is to rotate the tie plate 16 from some angle at which the tie plate 16 is oriented at the input of the tie plate straightener 12 to a substantially aligned or straightened orientation when the tie plate 16 exits the tie plate straightener 12. The edges of the tie plate 16 may be parallel but not necessarily in strict alignment at the output 22 of the straightener 12.

The tie plate straightener 12 includes an input 20, which is positioned adjacent to the first conveyor 14 and an output 22, which is positioned adjacent to the output conveyor 18. The tie plate straightener 12 is defined in part by a frame 24 which may take various forms and is utilized to support a plurality of rollers 26 which may or may not be driven. The tie plate straightener 12 also comprises a pair of guide walls 28, 29 which extend not only along the tie plate straightener 12 but may be interconnected with one or both of the input and output conveyors 14, 18. For example, the space between guide walls 28, 29 may be wider when positioned along the conveyor 14 and narrow as the tie plate 16 moves in the longitudinal $L_O$ direction toward the tie plate straightener 12. The narrowing of the space between the guide walls 28, 29 forces the tie plate 16 into better alignment with the tie plate straightener 12. In some embodiments, the tie plate conveyor 14 may be wider than the tie plate straightener 12 and therefore, the guide walls 28, 29 may desirably narrow toward the appropriate width of the tie plate straightener 12. In other embodiments, the conveyor 14 may have the same width as the tie plate straightener 12 but may alternatively differ according to other embodiments. The guide walls 28, 29 may be connected to the frame or may be connected to other structure in order to be positioned adjacent to the upper surface and near ends of the rollers 26.

Located between pairs of the plurality of rollers 26 is at least one first directional wheel 30 and at least one second directional wheel 32. In the instant embodiment, the first directional wheels 30 turn in a first direction, as indicated by an arrow in FIG. 2, and the at least one second directional wheel 32 rotates in the opposite direction again, as shown by an arrow in FIG. 2. In the instant embodiment, each of the at least one directional wheels 30, 32 are embodied by pairs of directional wheels between the pairs of the plurality of rollers 26. In other words, according to some embodiments, there may be one, two or more directional wheels for each of the at least one first directional wheel 30 and the at least one second directional wheel 32 which may also be driven.

The plurality of rollers 26 are rotatably supported by the frame 24 to allow rotation and passing along the tie plate straightener 12 of the tie plates 16 from the first conveyor 14 to the second conveyor 18. Bearings, bushings or other mounting arrangements may be utilized to provide the rotational support for the rollers 26 and may also allow for free rotation or driving by a motor. In the instant embodiment, the plurality of rollers 26 each have a rotational axis extending between sides of the frame 24 in the $L_A$ direction. Along the direction of $L_A$, the cross-sectional shape of each of the plurality of rollers 26 may vary.

Figure 2:
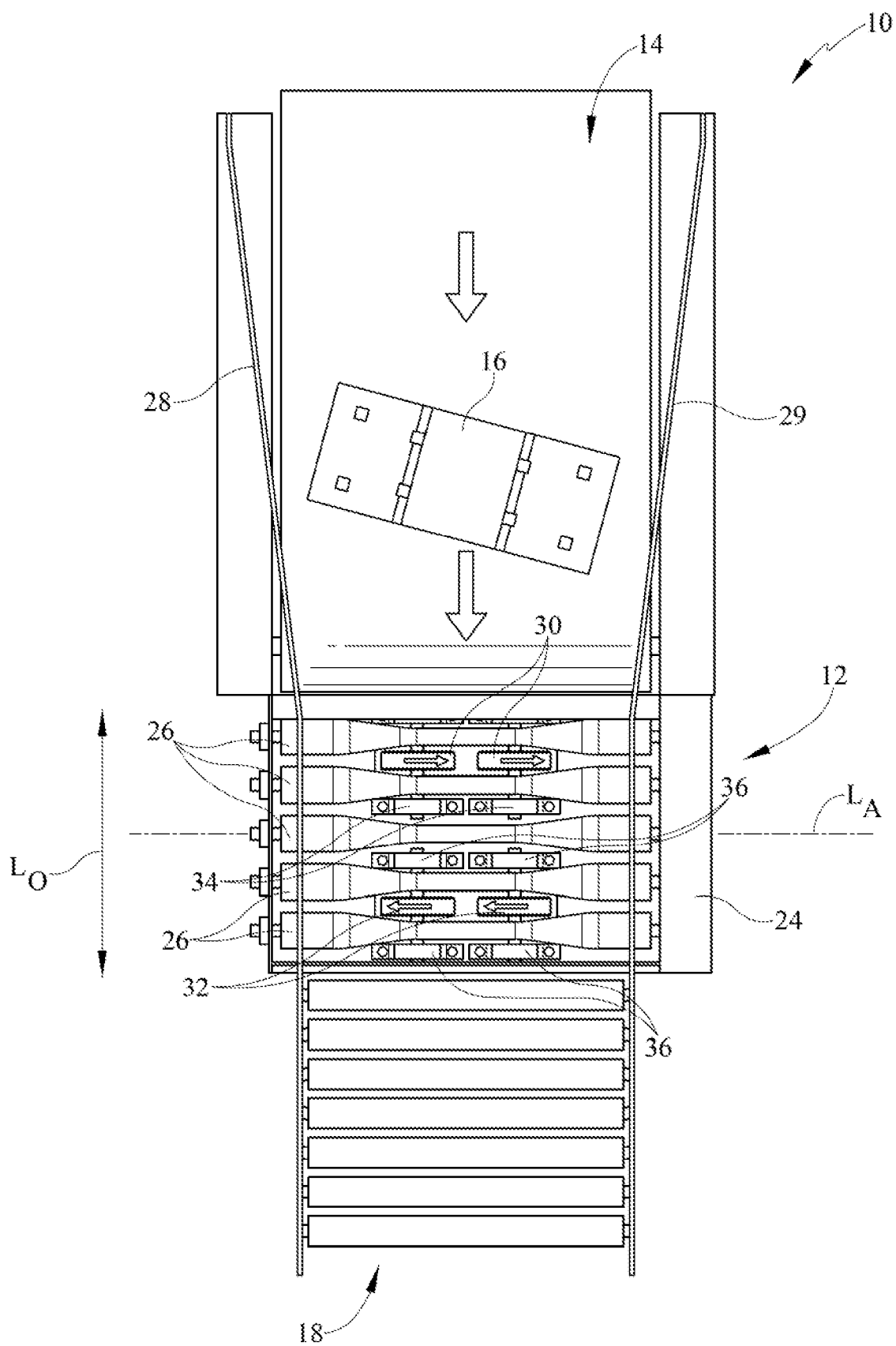
FIG. 2 depicts a top view of the tie plate straightener.

Referring now to FIG. 2, a top view of the tie plate distribution system 10 is shown, including the tie plate straightener 12. In this view, the plurality of rollers 26 are shown extending between sides of the frame 24 and rotatably supported by the frame 24. Between pairs of the rollers 26 are the at least one first directional wheel 30 and the at least one second directional wheel 32. The at least one first and second directional wheels 30, 32 are rotatably supported by bearing mounts 34, 36, respectively. Various support structures may be utilized and in varying orientation to provide the rotation of the first and second directional wheels 30, 32 to allow for driven rotation, for example by a motor or motor and drive.

As shown in the top view, the first and second directional wheels 30, 32 have axes, which extend in the longitudinal direction $L_O$. This allows the first and second directional wheels 30, 32 to rotate in a direction which is substantially parallel to the lateral direction $L_A$. This direction may vary depending on the direction of the axes of these wheels 30, 32.

The plurality of rollers 26 each have axes which extend in a direction which is the lateral direction $L_A$ and are, according to some embodiments, substantially perpendicular to the axes of the first and second directional wheels 30, 32. While the depicted embodiments show the axes of the first and second directional wheels 30, 32 being perpendicular to the axes of the plurality of rollers 26, the angle may be at an angle that is other than perpendicular. Alternatively stated, the angle between the axes of the first and second directional wheels 30, 32 and the plurality of rollers 26 may merely be transverse but not necessarily perpendicular to one another. Further, while the axes of the first and second directional wheels 30, 32 are shown in the same direction, the axes of the first and second directional wheels may be at differing angles rather than aligned and/or parallel.

Further, the plurality of roller 26 may be rotatably supported by bearings, bushings or other freely rotating structures. Additionally, and according to some embodiments, the rollers 26 may be supported by one or more motors M and one or more drives D. Thus in some embodiments, the plurality of rollers 26 may be driven by force of the first conveyor 14 and the engagement of tie plates between first conveyor 14 and tie plate straightener 12 or may be driven by a motor and drive M, D (FIG. 5) arrangement associated with one or more of the plurality of rollers 26.

Figure 3:
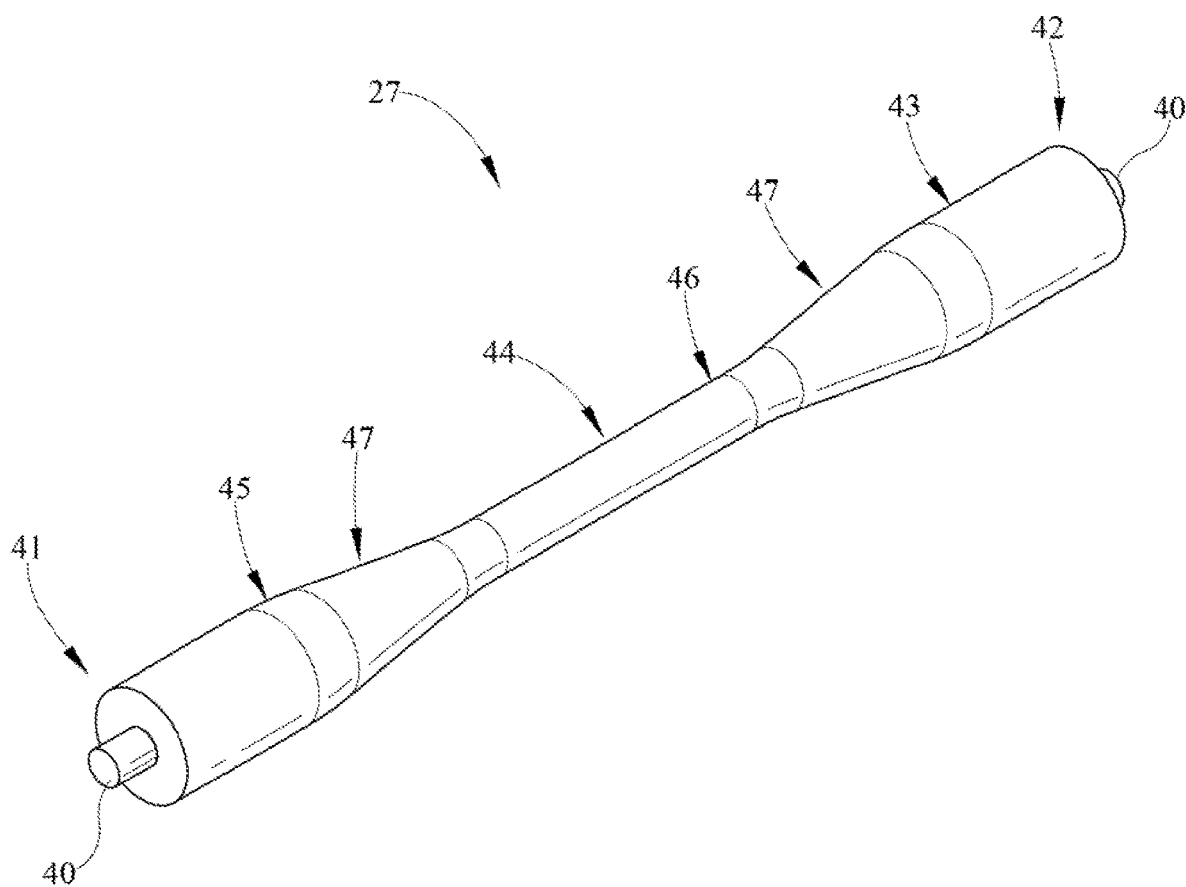
FIG. 3 depicts a perspective view of a tapered roller which may be utilized in the roller conveyor of the tie plate straightener.

Referring now to FIG. 3, a perspective view of a roller 27 which defines one of the plurality of rollers 26 (FIGS. 1, 2) is shown. The roller 27 has an axle or shaft 40 by which the rotation of the roller 27 is supported at the frame 24 (FIGS. 1, 2). The roller 27 has a varying cross-section from a first end 41 to a second end 42. The roller 27 is shown having a tapered cross-section that changes from a larger cross-section 43 to a smaller cross-section 44. Correspondingly, the larger cross-section 43 includes has a higher elevation 45 and the smaller cross-section 44 has a lower elevation 46. The tapered cross-section may vary in a linear manner or may be curved from larger to smaller, or vice-versa.

While the instant roller 27 is shown having the tapered portion 47, the roller 27 may alternatively be turned so as to have a stepped change from larger to smaller cross-section. Still further, variations may be utilized. For example, in the instant roller 27 the smaller cross-section 44 is generally centered between the first and second ends 41, 42. However, in other embodiments, the roller 27 may have multiple changes from larger to smaller cross-sections or still further, the smaller cross-sections may be located toward one of the first and second ends 41, 42.

The roller 27 may have a length, which has a relationship to the long dimension of the tie plate 16 (FIG. 2). The long dimension of the tie plate 16 is sized so that when the long dimension is aligned with or parallel to an axis of the roller 27, the ends or short edges of the tie plate 16 will engage the roller 27 near the larger cross-section 43 and the higher elevation 45. Thus, when the shorter edges of the tie plate 16 are engaging the high elevations 45 of the larger cross-sections 43, the tie plate 16 is elevated to a position above the lower elevation 46 of the smaller cross-section 44. Contrariwise when the tie plate 16 is skewed or misaligned and enters the smaller cross-section area 44 at the lower elevation 46, the tie plate straightener 12 (FIG. 2) functions to rotate the tie plate 16 to an alternate orientation for continued feeding through the tie plate distribution system 10 in an organized and consistent manner.

Figure 4:
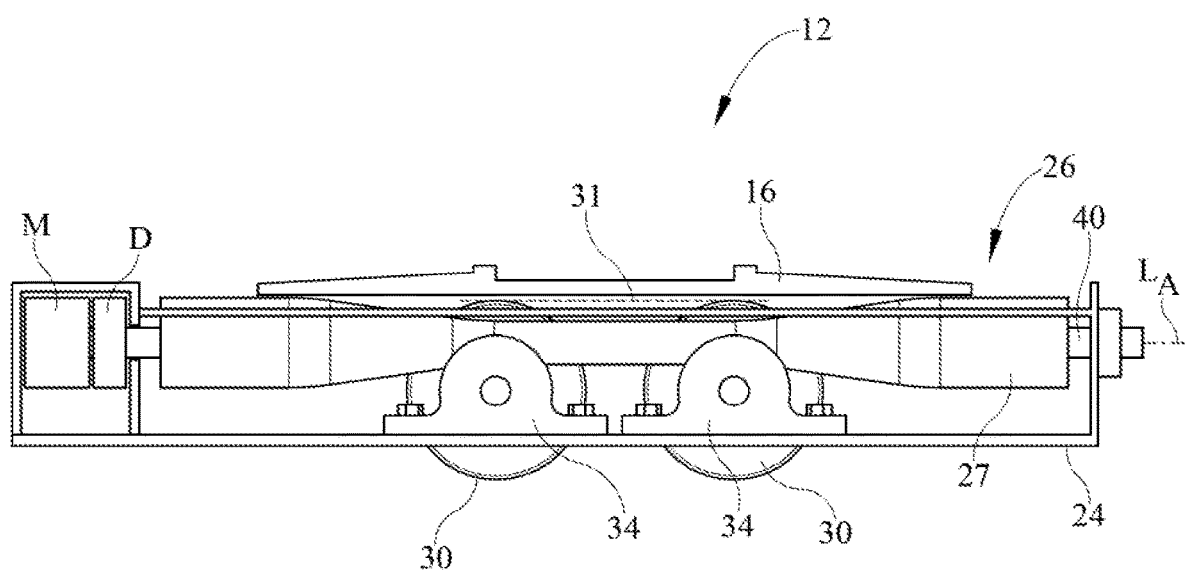
FIG. 4 is an end view of the tie plate straightener viewed from the input end toward the output end with the tie plate in an aligned orientation.

Referring now to FIG. 4, an end view of the tie plate straightener 12 is depicted from the input end toward the output end. The frame 24 is depicted. The frame 24 rotatably supports the plurality of rollers 26 at ends. In this view, the at least one first directional wheels 30 are shown supported by the bearing mounts 34. The depicted directional wheels 30, when mounted to the frame 24 have a height which have an upper elevation 31 which is greater than the lower elevation 46 (FIG. 3) but less than the higher elevation 45 (FIG. 3). Thus, when the tie plate 16 is correctly oriented on the plurality of rollers 26 wherein the ends of the short ends of the tie plate 16 are engaging the larger cross-section 43 at the higher elevations 45, the tie plate 16 will clear the upper elevation of the directional wheels 30, 32 (FIG. 2). In the alternative, and with brief reference to FIG. 5, the tie plate 16 is misaligned so that the short edges of the tie plate 16 are not both engaging the larger cross-section 43 at the higher elevation 45, the tie plate 16 extends into the smaller cross-section 44 at the lower elevation 46 so that the tie plate 16 will engage the directional wheels 30, 32 when moving across the tie plate straightener 12.

Figure 5:
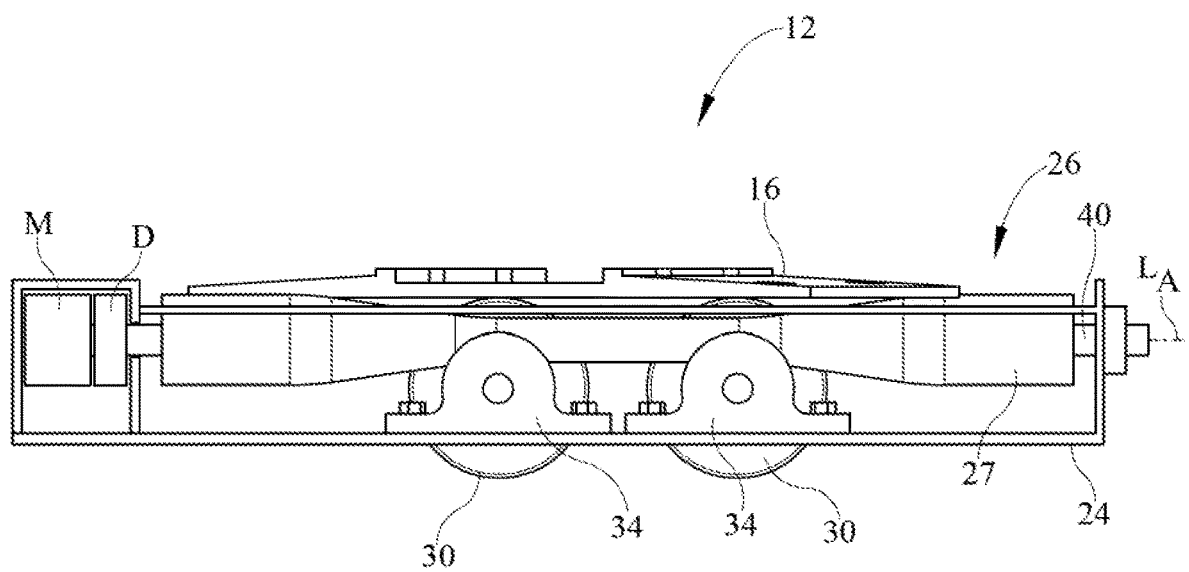
FIG. 5 depicts an end view of the tie plate straightener with the tie plate in a misaligned orientation.
Figure 6:
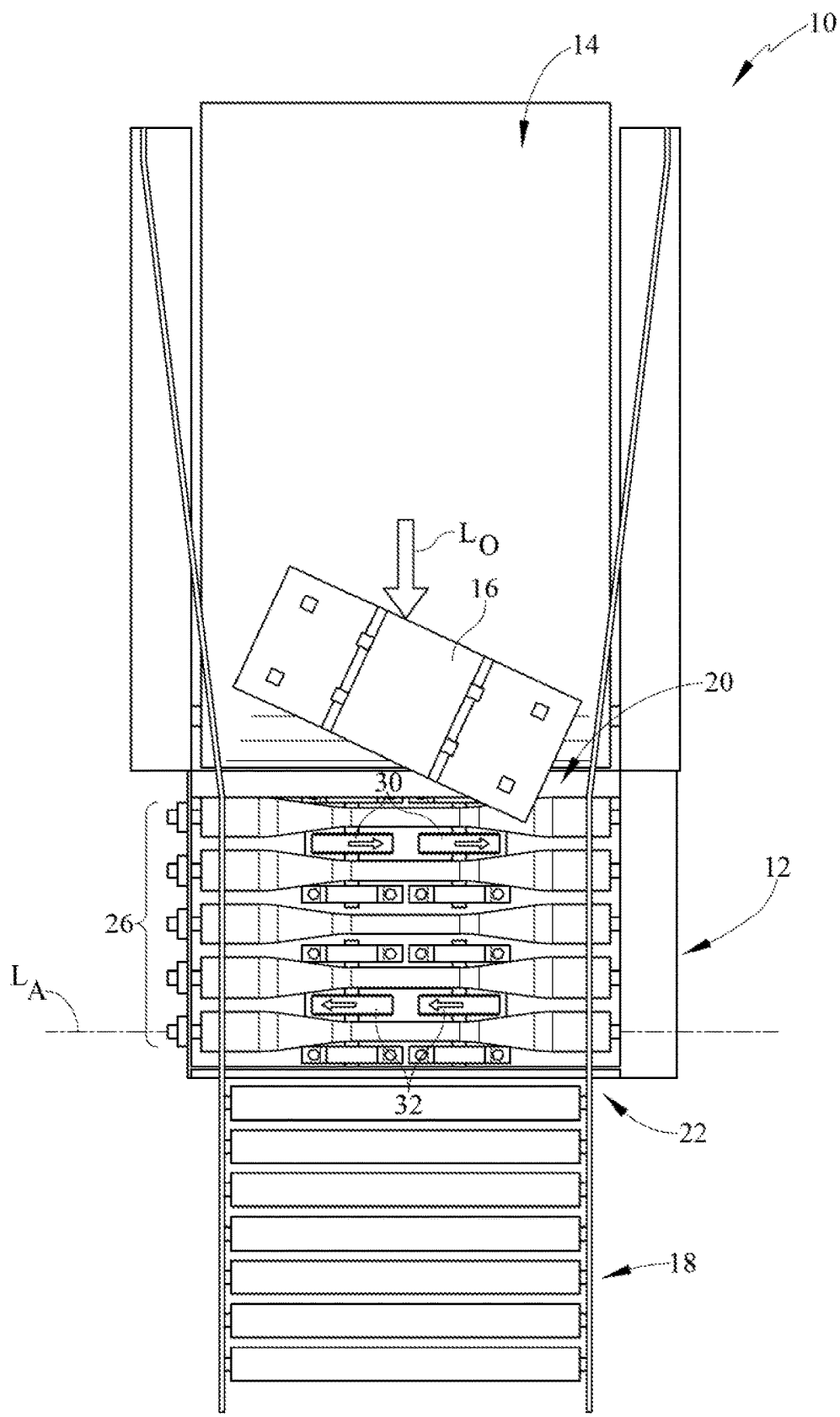
FIGS. 6-10 depicts a series of movements of a tie plate to depict the straightening of a misaligned tie plate between the input and the output of the tie plate straightener; and, FIG. 11 is a top view of an alternate embodiment of a tie plate straightener.

Also shown in FIGS. 4 and 5, are schematically depicted motor M and drive D. The motor and drive M, D may be located at the frame 24 to cause rotation of the plurality of rollers 26. The motor M may be an electric, hydraulic or other type of motor causing a rotational input. The drive D may be any of various types of drives including, but not limited to, gear drive, belt drive, chain drive, combination or other type of drive. The axes of the motor M and drive D may be aligned or may be at an angle to one another. The drive D receives the input of the motor M and causes rotation of one or more of the rollers 27 of the plurality of rollers 26 and/or the directional wheels 30, 32. One or more motors and drives may be used for the plurality of rollers 26 and one or more motors and drives may be used for the directional wheels 30, 32. The motors and drives may be the same or may differ for the rollers 26 and directional wheels 30, 32. It should be clear that motors may be utilized without drives, in some embodiments.

Referring now to FIGS. 6-10, a series of top views depicting exemplary operation of the tie plate straightener are shown. The tie plate 16 which is misaligned at the input 20 and moving through the output 22 so that the tie plate 16 may be reoriented from a misaligned orientation to an aligned or straightened orientation. The orientation is depicted such that the long edge of the tie plate 16 is at an angle to the lateral direction $L_A$. However, in the desired orientation, the long edge of the tie plate 16 is extending generally perpendicular to the longitudinal axis $L_O$ and in the direction of lateral axis $L_A$, but other desirable orientations may be utilized such that the tie plate 16 is moved from an undesired or misaligned orientation to the desired aligned orientation, whatever such orientation may be. Additionally, the tie plate 16 may be positioned by the guide walls 28, 29 or other structure to move or position the tie plate to a desired location. This may be done in a multitude of ways. It should be understood that the re-orientation of the tie plates may include rotation of the tie plates about a vertical axis to align an edge of the tie plates relative to, or in, a desired direction and/or may include positioning of the tie plates 16 to a specific position on the rollers. In sum reorientation or straightening of the tie plates may include both orientation and position or may solely include orientation or solely position.

In the depicted embodiment, the tie plate 16 is moving in the longitudinal $L_O$ direction and the tie plate is skewed at some angle such that the long edges of the tie plate 16 are not perpendicular to the longitudinal $L_O$ direction. Such perpendicular orientation of the long edges of the tie plate 16 to the longitudinal $L_O$ direction is desirable according to the instant embodiment. The tie plate 16 is moving from the first or input conveyor 14 across an input 20 of the tie plate straightener 12. It is desirable that the tie plate 16 be rotated so that it exits the output 22 of the tie plate straightener 12 with the long edges of the tie plate 16 being perpendicular to the $L_O$ direction or alternatively stated, so that the long edges of the tie plate 16 are parallel to the lateral $L_A$ direction. In the instant embodiment, the at least one first directional wheels 30 are rotating in a first direction and the at least one second directional wheels 32 are rotating in an opposite second direction. The plurality of rollers 26 may be forced to rotate in the direction of the longitudinal $L_O$ arrow upon engagement by the tie plate 16 and due to the rotation of the first conveyor 14. However, these plurality of rollers 26 according the instant embodiment, are free to rotate and may or may not be driven, therefore, if the first conveyor 14 is for example, a gravity chute, the movement of the tie plate 16 induced by gravity will cause the plurality of rollers 26 to move once engaged by the tie plate 16. As depicted, the tie plate 16 is advanced and due to the skewed angle of the tie plate 16 relative to either of the lateral direction $L_A$ or the longitudinal direction $L_O$, the tie plate 16 is located relative to each of the plurality of rollers 26 such that the elevation of some portion of the tie plate 16 is lower than the high elevation 45 (FIG. 3).

Figure 7:
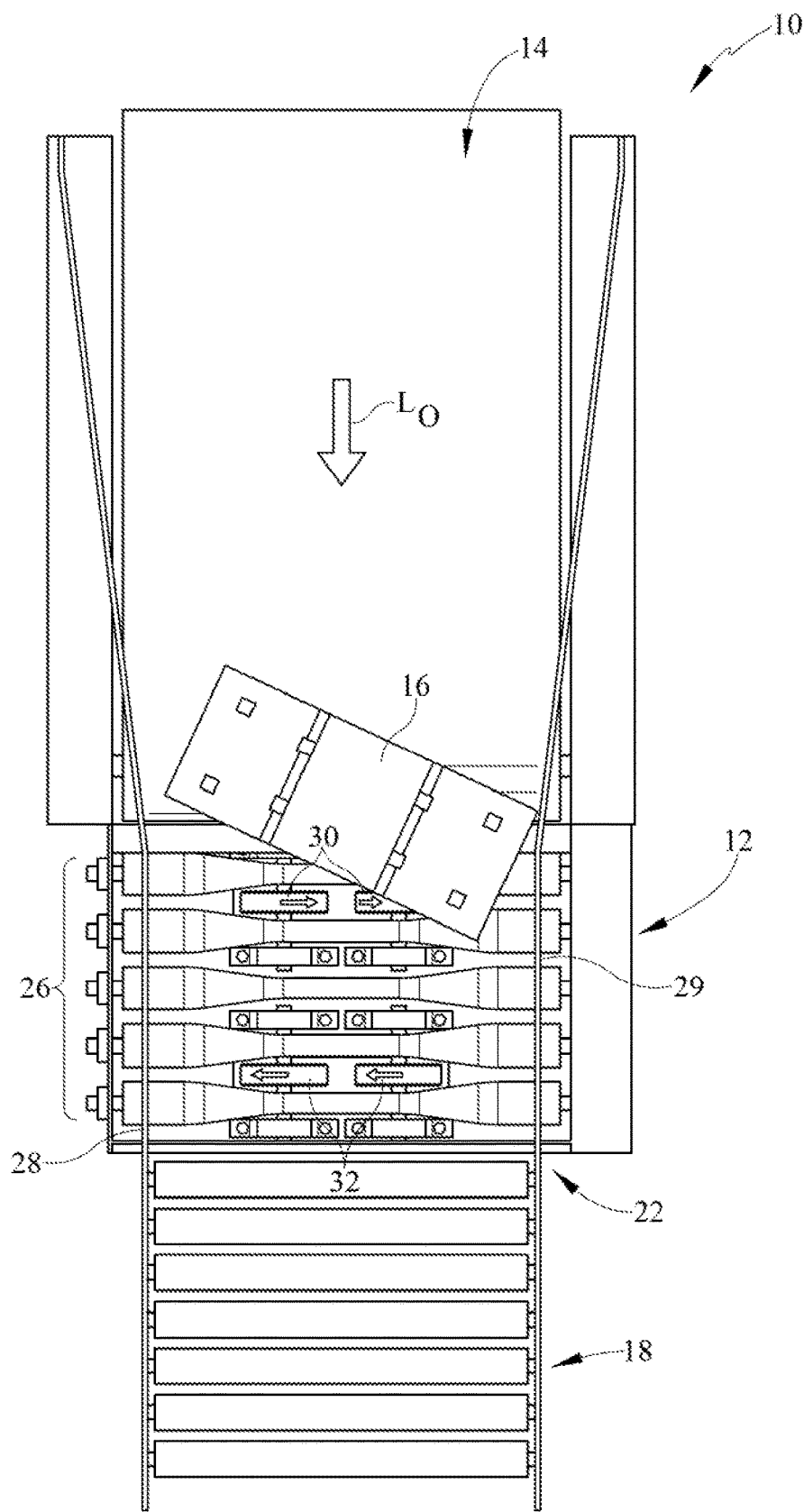

Referring now to FIG. 7, a top view continuing in the series depicts a further movement of the tie plate 16 along the tie plate straightener 12. In this view, the tie plate 16 has engaged the first directional wheels 30 and moved in a lateral direction $L_A$ toward guide wall 29. When this occurs, the guide wall 29 may cause the tie plate 16 to begin to pivot about a vertical axis, extending into the figure. As the tie plate 16 continues to move in the longitudinal direction $L_O$ the tie plate 16 is further engaged with both of the first directional wheels 30 forcing the tie plate 16 toward and/or against the guide wall 29. This causes one short edge of the tie plate 16 to further engage the guide wall 29 substantially, if not completely, during such motion.

Figure 8:
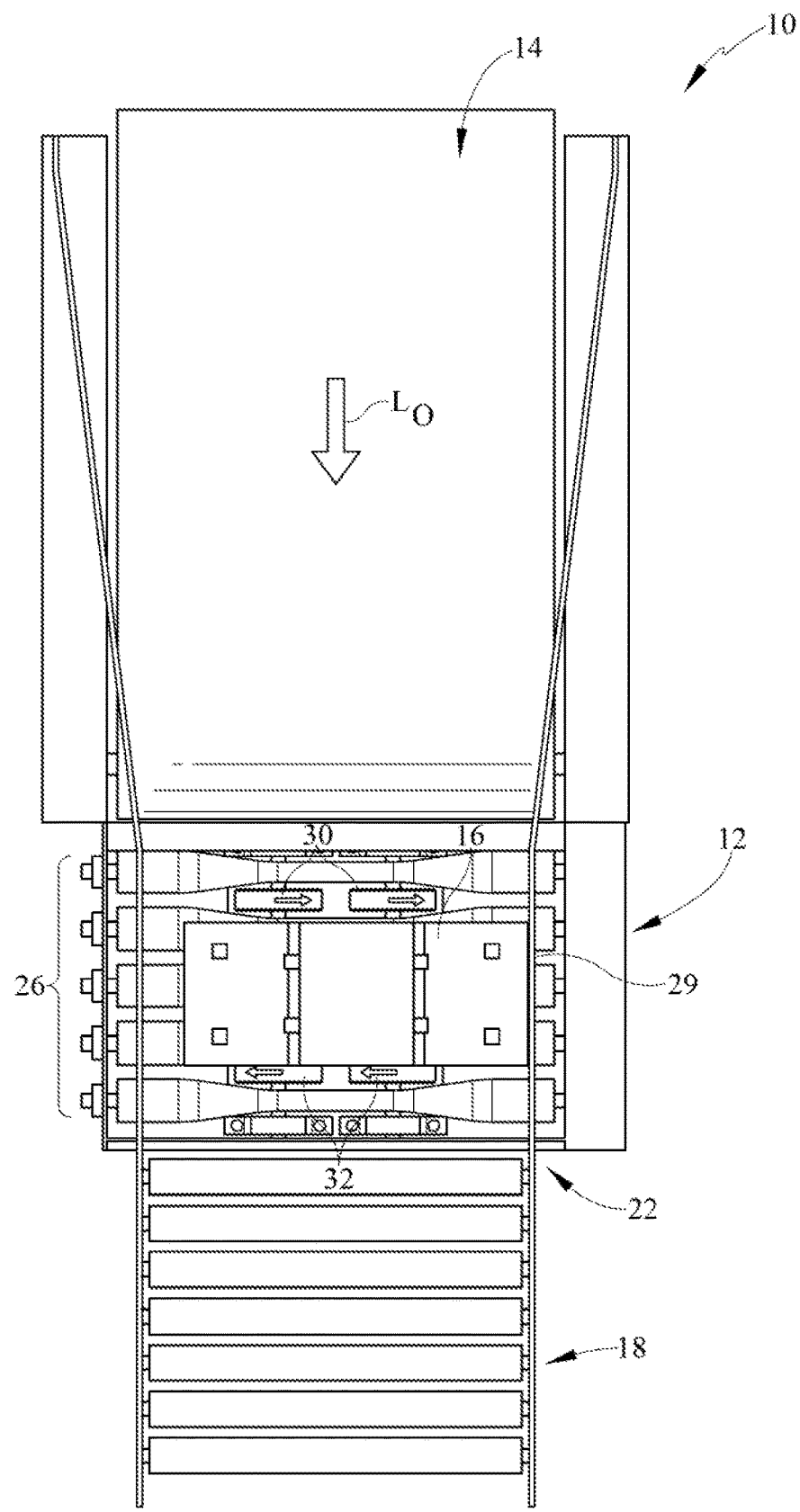

Referring now to FIG. 8, a top view of a tie plate structure straightener 12 is shown again and the tie plate 16 is shown moving downstream in the longitudinal direction $L_O$ of the tie plate distribution system 10. Once the short edge of tie plate 16 is fully engaging the guide wall 29, the tie plate 16 is fully pivoted so that the short edge of the tie plate 16 is parallel with the guide wall 29. The tie plate 16 is moving beyond the first directional wheels 30 and is against the guide wall 29. As a result, the left-hand end of the tie plate 16 is below the high elevation 45 (FIG. 3) of the plurality of rollers 26. As a result, as the tie plate 16 continues to move downstream and move into engagement with the second directional wheels 32.

Figure 9:
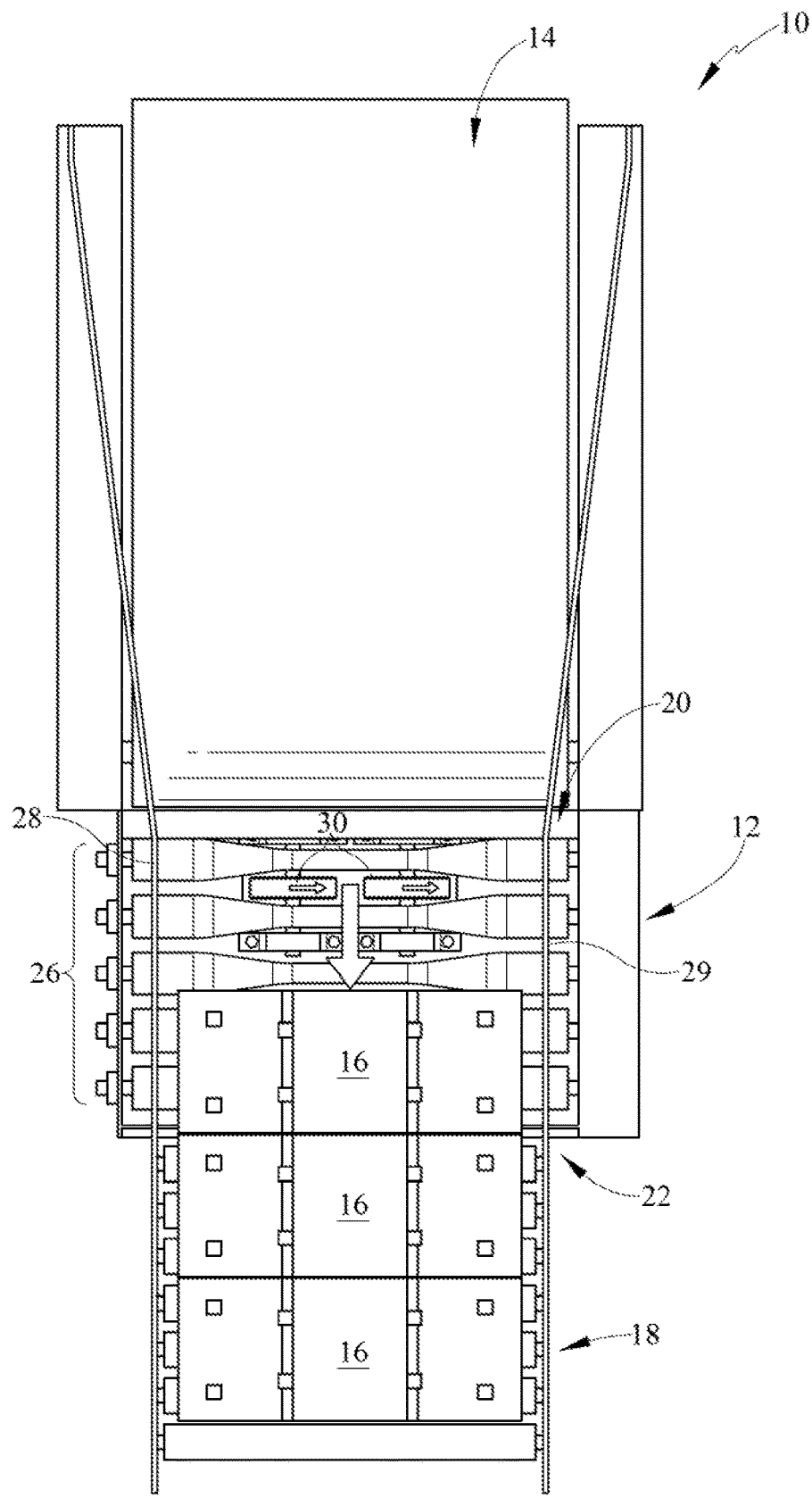

With reference now to FIG. 9, since the left-hand end of the tie plate 16 was at a lower elevation than the second directional wheels 32, the wheels 32 engage the lower surface of the tie plate 16 and force the tie plate 16 to the left in the depicted embodiment, toward guide wall 28, causing the corresponding edge of the tie plate 16 to move upwardly along the taper of the plurality of rollers 26. As this occurs, the tie plate 16 will reach a position where both ends, the short edges, of the tie plate 16 are disposed at the higher elevation 45, larger cross-section 43 of each roller 27 and the tie plate 16 is elevated above the second directional wheels 32. In this position, the tie plate 16 is correctly oriented and may continue moving through the output 22 of the tie plate straightener 12 and onto the second conveyor 18. This conveyor 18 as previously noted, may take various forms including roller conveyor, belt conveyor, chute, vibratory conveyor or other moving structure, which is dynamic, static or some combination thereof.

Figure 10:
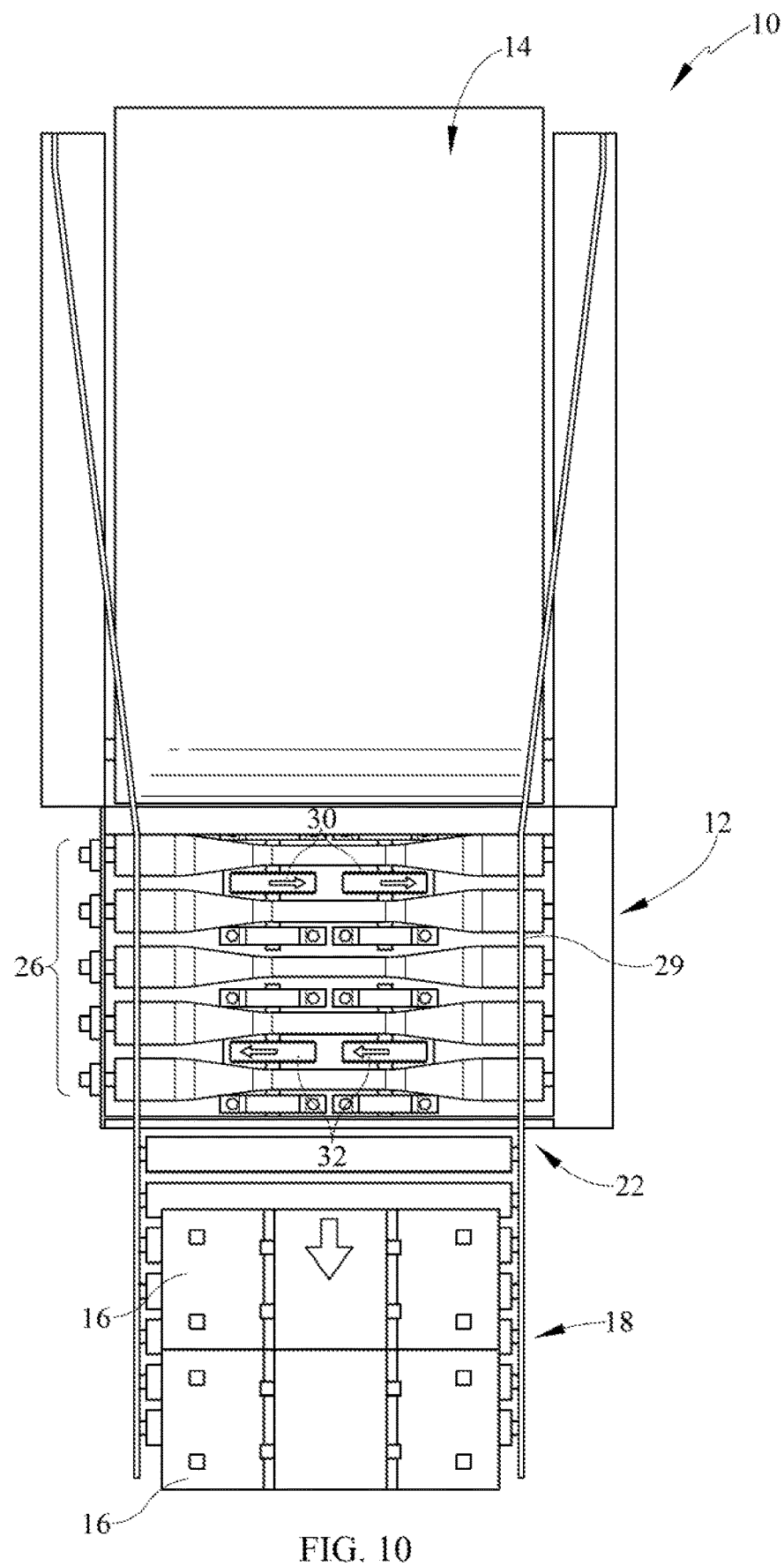

As shown in FIG. 10, the tie plate 16 continues moving along the second conveyor 18. With reference to both FIGS. 9 and 10, it is desirable to create resistance with the conveyor 18. This slows the tie plates 16 disposed over the second directional wheels 32. With the tie plates 16 slowed or stopped at the directional wheels 32, the directional wheels 32 have time and enough engagement to straighten the tie plate 16 in this area. As, shown in FIG. 9, the tie plates 16 on the second conveyor 18 are backed up so that the tie plate 16 on the straightener 12 stops at least momentarily increasing the chance of engagement with the second directional wheel 32. This backup provides a wall or blockage that the tie plate 16 on the straightener 12 can turn against, aiding straightening. As shown in FIG. 10, one of the tie plates 16, closest to the end of the second conveyor 18 has advanced, so that tie plate 16 from the straightener 12 has moved on to the second conveyor 18.

As described earlier, the rollers of the second conveyor 18 may be freely rotating. However, in order to create this stoppage and ensure tie plate 16 is straightened at the at least one second directional wheel 32, one or more of the rollers, or for non-limiting example, a belt of the second conveyor 18 may be slowed, frictionally, or stopped from rotating. This will create a backup allowing the tie plate 16 on the straightener 12 to straighten at the second directional wheel 32 before overcoming the slowed or stopped roller of the conveyor 18. In the instant embodiment, the last two conveyor rollers may be stopped or slowed to create the desired backup. If an alternative conveyor type is utilized, it may be desirable to create a frictional increase so that the tie plates 16 may have to overcome such before advancing.

According to additional embodiments, the tie plate straightener 12 may take an alternate form. In some embodiments, the plurality of rollers 26 may be replaced by three short belt-type conveyors. For example, a first conveyor and a second conveyor may be spaced apart so that at least one directional wheel may be disposed therebetween. In an alternative embodiment, the directional wheels may be replaced by a directional belt, which extends laterally. This will function similarly to the wheels 30, 32 in that the tie plate will be driven to the right or left, laterally, in order to turn the tie plates 16 into a desired orientation.

Downstream, between the second and third conveyors may be a second at least one directional wheel. Alternatively to the wheels, a directional belt may be utilized so that the belt engages and causes rotation of the tie plates, as the previously described directional wheels do. As with the previously described embodiments, the directional belts may be at a height which is lower than an upper elevation of the first and second conveyors or rollers but higher than a lower elevation of the rollers or first and second conveyor belts. Due to the desire to have differing elevations for the first and second conveyor belts, it may be desirable to provide the first and second conveyors with a troughed cross-section so that the directional wheels or belts have an upper elevation at an elevation between the upper and lower elevation of the belt conveyors.

Figure 11:
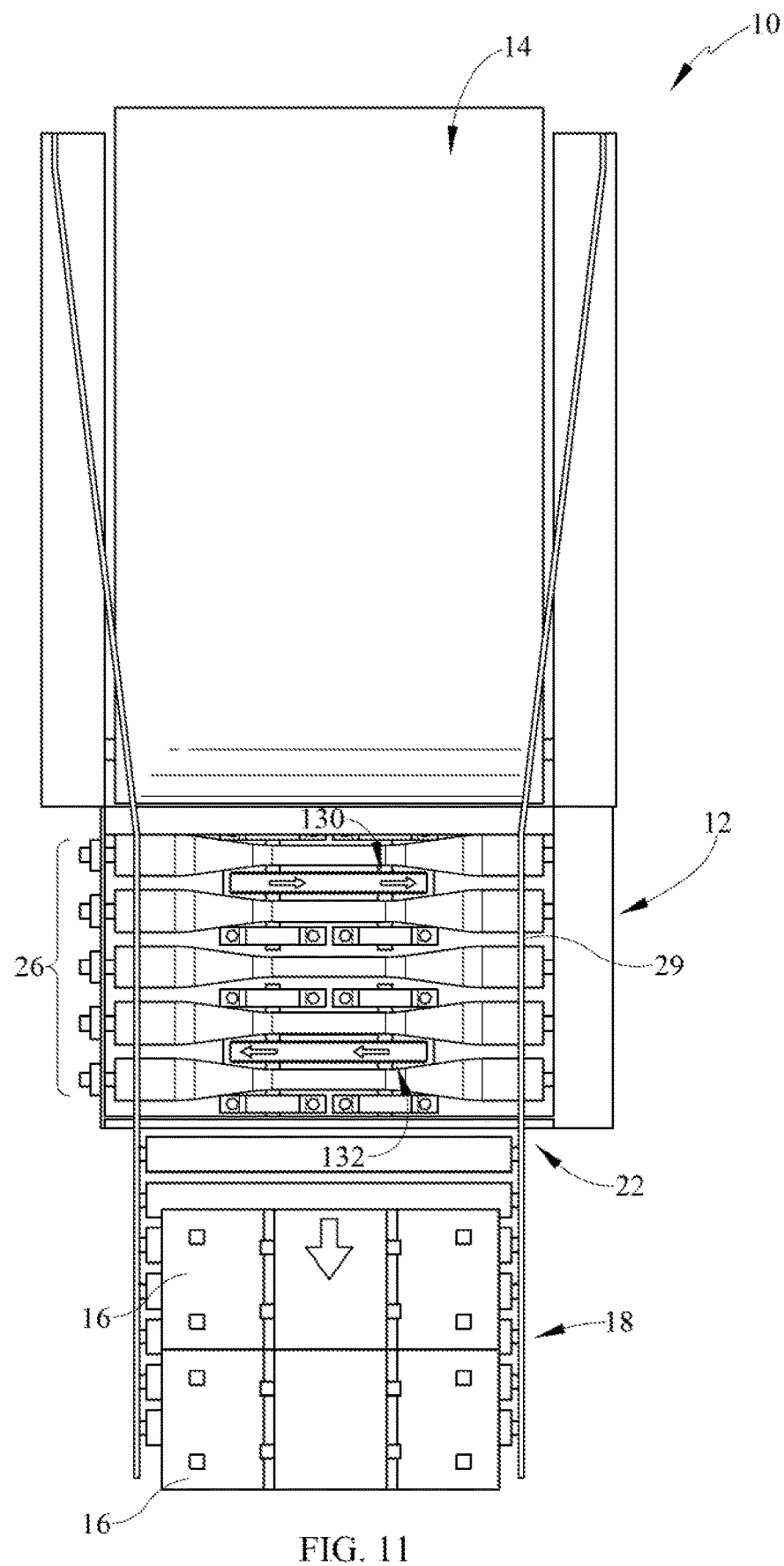

With reference to FIG. 11, a top view of an alternate embodiment is depicted. The embodiment depicts an alternative which has been previously referred to wherein the directional wheels are replaced with directional belts 130, 132. The elevations of the belts 130, 132 is as previously described relative to the directional wheels. That is, the belts 130, 132 are disposed in alignment with the varying diameter of the plurality of rollers, and specifically aligned with the lower elevations of the plurality of rollers 26. Thus when ends of the tie plates 16 are not at the high elevations of the roller 26, the tie plates 16 can engage the belts 130, 132.

In this embodiment, the belts 130, 132 may be placed around a directional wheel, or alternatively, the wheels may be replaced with pulleys about which the belts are positioned. Thus, the pulleys may be referred to as directional wheels.

The belt 130 directs the tie plates to turn in a first direction and the second tie belt 132 directs the tie plate to turn in the opposite direction. As a result, the tie plates are rotated into alignment as shown at the lower portion of the figure. As with the previous embodiment, the directional wheels may be driven by a motor M which only drives the directional wheels and/or belts, or alternatively a motor M which drives both of the plurality of rollers 26 and the directional wheels and/or belts 130, 132. A drive D may be optionally utilized in these embodiments.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and embodiments has been presented for purposes of illustration. It is not intended to be exhaustive or to limit the embodiments to the precise steps and/or forms disclosed, and obviously many modifications and variations are possible in light of the above teaching. It is intended that the scope of the embodiments and all equivalents be defined by the claims appended hereto.

What is claimed is:

1. A method of straightening tie plates, comprising:
positioning a tie plate at an input of a roller conveyor;
engaging said tie plate with one of a plurality of rollers of said roller conveyor, said plurality of rollers each having a varying cross-section with a larger diameter and a smaller diameter;
engaging said tie plate with at least one directional wheel when said tie plate is aligned with said smaller diameter of said plurality of rollers;
rotating said tie plate with said at least one directional wheel adjacent to said plurality of rollers; and,
limiting engagement of said at least one directional wheel by said tie plate with said rotating.

2. The method of claim 1, said rotating being a first rotation about a vertical axis.

3. The method of claim 2, said rotating further comprising a second rotation about said vertical axis in a second direction.

4. The method of claim 3, said second rotation performed by a second directional wheel.

5. A tie plate straightener, comprising:
- a conveyor having an input and an output which define a longitudinal direction;
- a plurality of rollers on said conveyor defining a conveying surface each of said plurality of rollers having a varying cross-section defining at least a larger diameter and a smaller diameter;
- a first directional wheel disposed between a first pair of said plurality of rollers, said first directional wheel turning in a first direction;
- a second directional wheel disposed between a second pair of said plurality of rollers, said second directional wheel turning in a second direction;
- said first and second directional wheels being disposed in alignment with said smaller diameter of said plurality of rollers;
- wherein a tie plate moves across the plurality of rollers and when positioned in said smaller diameter, said tie plate engages at least one of said first and second directional wheels.

6. A tie plate straightener, comprising:
- one of a plurality of rollers to move tie plates in a longitudinal direction between an input and an output of said tie plate straightener;
- at least one directional belt disposed between said plurality of rollers and which moves in a direction transverse to rotation of the plurality of rollers;
- said at least one directional belt directing tie plates into an adjacent guide wall and pivoting said tie plates into a desired orientation.

* * * * *